US008185086B2

(12) United States Patent  (10) Patent No.: US 8,185,086 B2
Bozionek et al.  (45) Date of Patent: May 22, 2012

(54) METHOD AND EMERGENCY SYSTEM FOR HANDLING EMERGENCY CALLS FROM A COMMUNICATION TERMINAL

(75) Inventors: Bruno Bozionek, Borchen (DE); Dieter Klaus, Delbrück (DE); Hubert Niemeier, Paderborn (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 552 days.

(21) Appl. No.: 12/227,579

(22) PCT Filed: Feb. 13, 2007

(86) PCT No.: PCT/EP2007/051402
§ 371 (c)(1),
(2), (4) Date: Nov. 21, 2008

(87) PCT Pub. No.: WO2007/137882
PCT Pub. Date: Dec. 6, 2007

(65) Prior Publication Data
US 2009/0093230 A1  Apr. 9, 2009

(30) Foreign Application Priority Data
May 31, 2006 (DE) .......................... 10 2006 025 363

(51) Int. Cl.
*H04M 11/04* (2006.01)
(52) U.S. Cl. ..................................... 455/404.1; 340/506
(58) Field of Classification Search .................. 340/506; 455/404.1
See application file for complete search history.

(56) References Cited

U.S. PATENT DOCUMENTS

| 6,885,936 | B2 | 4/2005 | Yashio et al. | |
| 7,880,604 | B2 * | 2/2011 | McKenna et al. | 340/506 |
| 2002/0086659 | A1 | 7/2002 | Lauper | |
| 2002/0086669 | A1 | 7/2002 | Bos et al. | |

FOREIGN PATENT DOCUMENTS

| DE | 19604084 A1 | 10/1996 |
| DE | 10254623 A1 | 6/2004 |
| DE | 202004005540 U1 | 7/2004 |
| DE | 10347894 B4 | 11/2005 |
| EP | 1189470 A2 | 3/2002 |
| JP | 2003248885 A | 9/2003 |
| JP | 2004015336 A | 1/2004 |
| JP | 2004118387 A | 4/2004 |
| RU | 2184395 C2 | 6/2002 |
| WO | 9427160 A1 | 11/1994 |
| WO | WO 0117302 A1 | 3/2001 |

\* cited by examiner

*Primary Examiner* — William D Cumming

(57) ABSTRACT

After an emergency call from a communication terminal has been received by an emergency call center, the position of the communication terminal is determined by querying a database. An area around the position of the communication terminal is defined as danger area and other communication terminals located in the danger area are identified. Communication terminals of rescue workers in the danger area who are to be informed are then selected. Finally, emergency information is generated, which can, for example, contain information about escape routes for potentially imperiled persons or access route information for rescue workers. This emergency information is then communicated to each of the selected communication terminals of potentially imperiled persons and/or rescue workers.

9 Claims, 5 Drawing Sheets

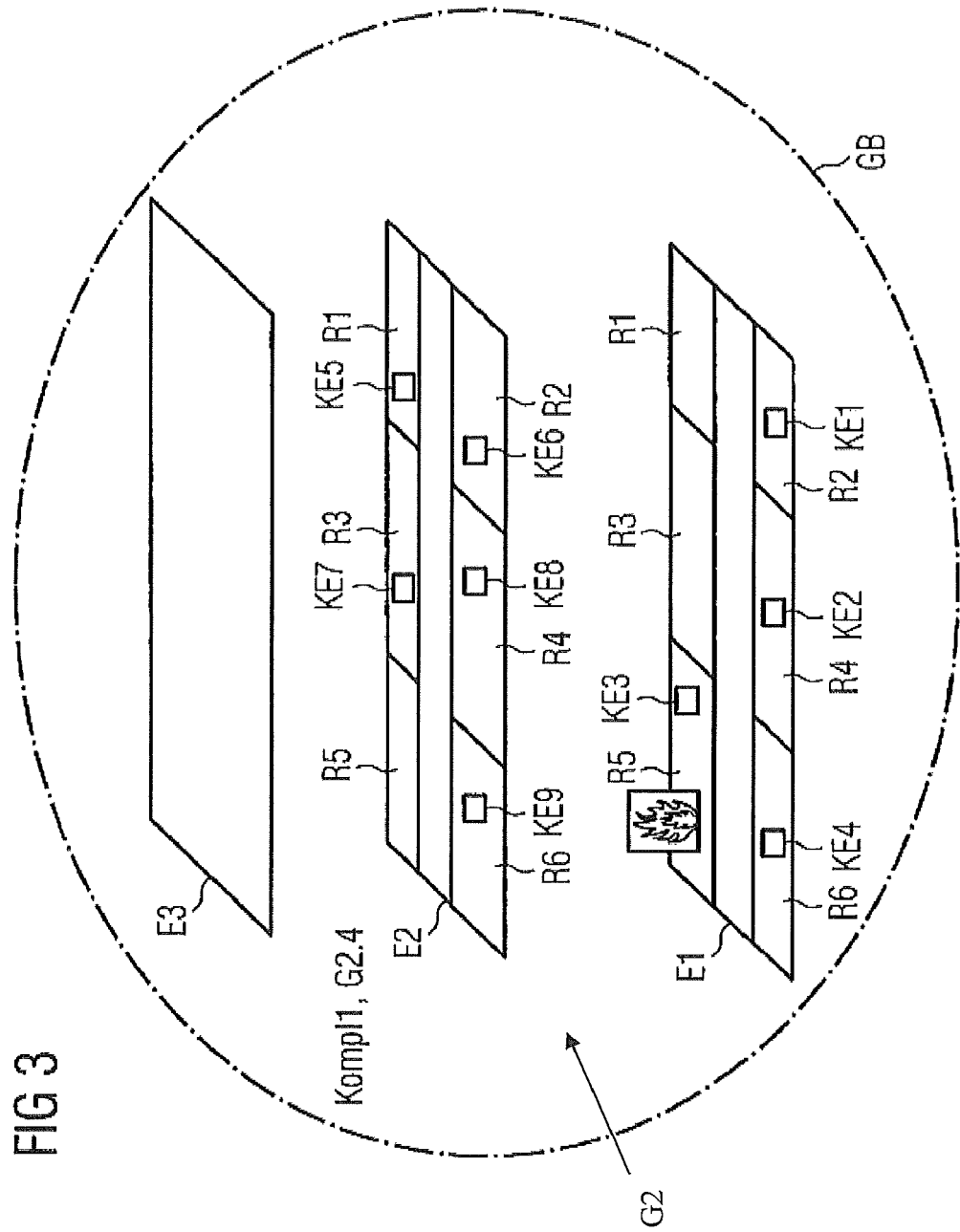

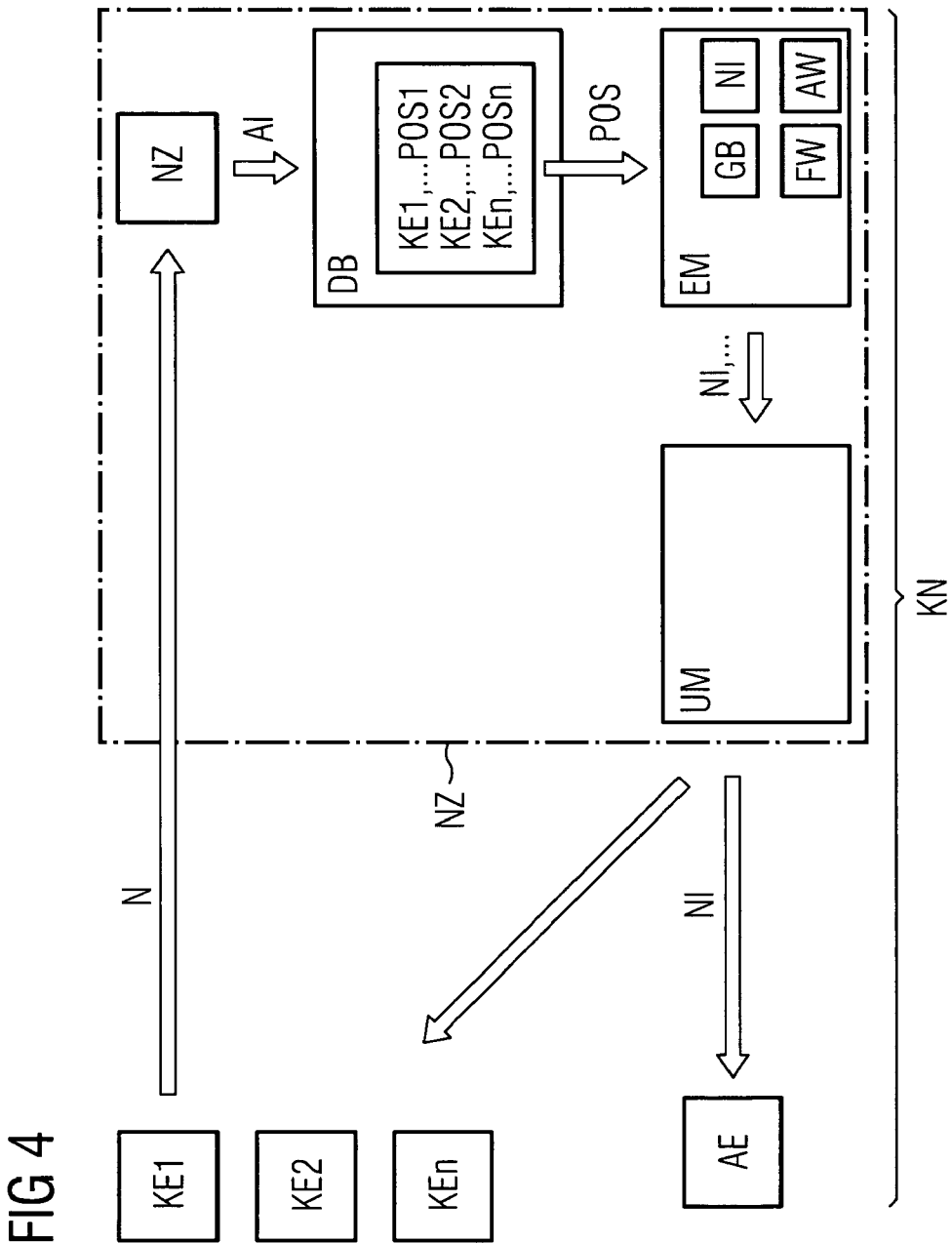

A call center determining the position of a communication terminal making an emergency call after an emergency call is received.

↓

The call center defines the spatial area around the position of the communication terminal as a danger area

↓

The call center identifies wireless communication terminals located in the danger area by utilizing one or more communication networks or localization devices that utilize at least one of: Global Positioning System, system inherent positiong methods of GSM, UMTS, DECT, RFID, or WLAN networks, and position information generated indicating the position of the wireless communication terminals in the danger area. Databases may also be queried by the call center to determine which wireless communication terminals are assigned to the deterined persons located within a danger area.

↓

The call center generates emergency information that includes a tpye of a danger situation, uregency of the danger situtation, type of measures to be taken, uregency of the measures, and escape route information for leaving the danger area and transmits that emergency information to the identified wireless communication terminals located in the danger area. The transmission may include email, short messages, voice messages, or messages utilizing Short Message Service or Multime Media Messaging Service.

FIG. 5

METHOD AND EMERGENCY SYSTEM FOR HANDLING EMERGENCY CALLS FROM A COMMUNICATION TERMINAL

CROSS REFERENCE TO RELATED APPLICATIONS

This application is the US National Stage of International Application No. PCT/EP2007/051402, filed Feb. 13, 2007 and claims the benefit thereof. The International Application claims the benefits of German application No. 10 2006 025 363.9 filed May 31, 2006, both of the applications are incorporated by reference herein in their entirety.

FIELD OF INVENTION

The invention relates to a method and system handling emergency calls from a communication terminal.

BACKGROUND OF THE INVENTION

An emergency call is a connection from a communication terminal, mostly to an emergency call center, in order to raise the alarm in an emergency at a professional service such as a rescue service, fire service or the police. Special emergency terminals (known as emergency telephones) but also normal wired or wireless communication terminals can be used for this purpose.

The emergency call center can be a factory security center or a public emergency call center for example. This emergency call center accepts the emergency call of the communication terminal and processes said call. Usually the emergency call center asks for the following information in such cases:
  Where is the emergency occurring?
  What has happened?
  How many people are affected?
  What type of emergency has occurred?

Further information, such as the time of the emergency call, the identity of the caller and the telephone number of the communication terminal making the emergency call and such like is also recorded in these cases.

If the emergency call is made for example from a public telephone or from a mobile telephone in many cases an automatic, but mostly imprecise, determination of the position of the communication terminal making the emergency call is possible.

Thus in the case of an emergency call from a mobile telephone it is possible for the emergency call center to roughly identify the approximate position of the mobile telephone with the aid of information of the mobile radio network operator. This is done by the base station from which the mobile telephone has established the connection to the mobile radio network being determined. Its precise location is then known. Since the accuracy of the positioning depends on the size of the radio cell of the mobile radio network covered by the base station, the location of the mobile telephone making the emergency call can only be established in towns with an inaccuracy of 100 m to 1600 m, and in the countryside with an inaccuracy of up to 24 km. This merely enables it to be determined whether a mobile telephone is located in a radio cell, but not whereabouts in a radio cell the mobile telephone is precisely located.

In the case of an emergency call from a public telephone network its position can sometimes be determined by interrogating a database in which position information of the public telephone network is stored. The same applies to an emergency call made from a communication terminal within a non-public communication network, e.g. a corporate communication network. Here too it is possible to operate such a database and thus determine the position of the communication terminal making the emergency call. As a rule the information stored in such a database is permanently-stored or static position information.

However for effective emergency management by the emergency call center the most up-to-date determination of the location of the emergency call is of decisive importance, to enable correspondingly current accurate and comprehensive information to be transmitted to the rescue workers.

However the information available to the emergency call center and the rescue workers largely relates to the static position information just described from such a database and to the additional information that the person making the emergency call can supply on request via their communication terminal to the emergency call center.

Frequently there is also no further information available to the emergency call center. This means that the center is restricted to this information as a basis for deciding on a rescue deployment, planning and executing it.

Publication DE 102 54 623 A1 discloses a mobile terminal, as well as an emergency call communication system in which, for an emergency call from a mobile communication terminal in a mobile radio network, the selection of the rescue control center to which the emergency call is directed is made depending on the data provided by the mobile radio network characterizing the approximate location area of the mobile communication terminal.

SUMMARY OF INVENTION

The object of the invention is, in the event of an emergency call from a communication terminal, to improve the handling of said emergency call. The object is achieved by the features of the claims.

A major advantage of the inventive method is that the current position of the communication terminal making the emergency call is recorded first of all. A danger area is defined around this recorded position of the communication terminal making the emergency call in order to identify further communication terminals in the danger area. Emergency information is generated and explicitly transmitted to all or to selected identified communication terminals of persons or rescue workers affected in the defined danger area.

Further advantageous developments of the inventive method, as well as an emergency system and an emergency call system, are to be found in the further claims.

BRIEF DESCRIPTION OF THE DRAWINGS

The method in accordance with the invention is explained in greater detail below with reference to diagrams.
The figures show:
FIG. 5 is a flow chart illustrating a method for handling emergency calls.

DETAILED DESCRIPTION OF INVENTION

Figure 1:
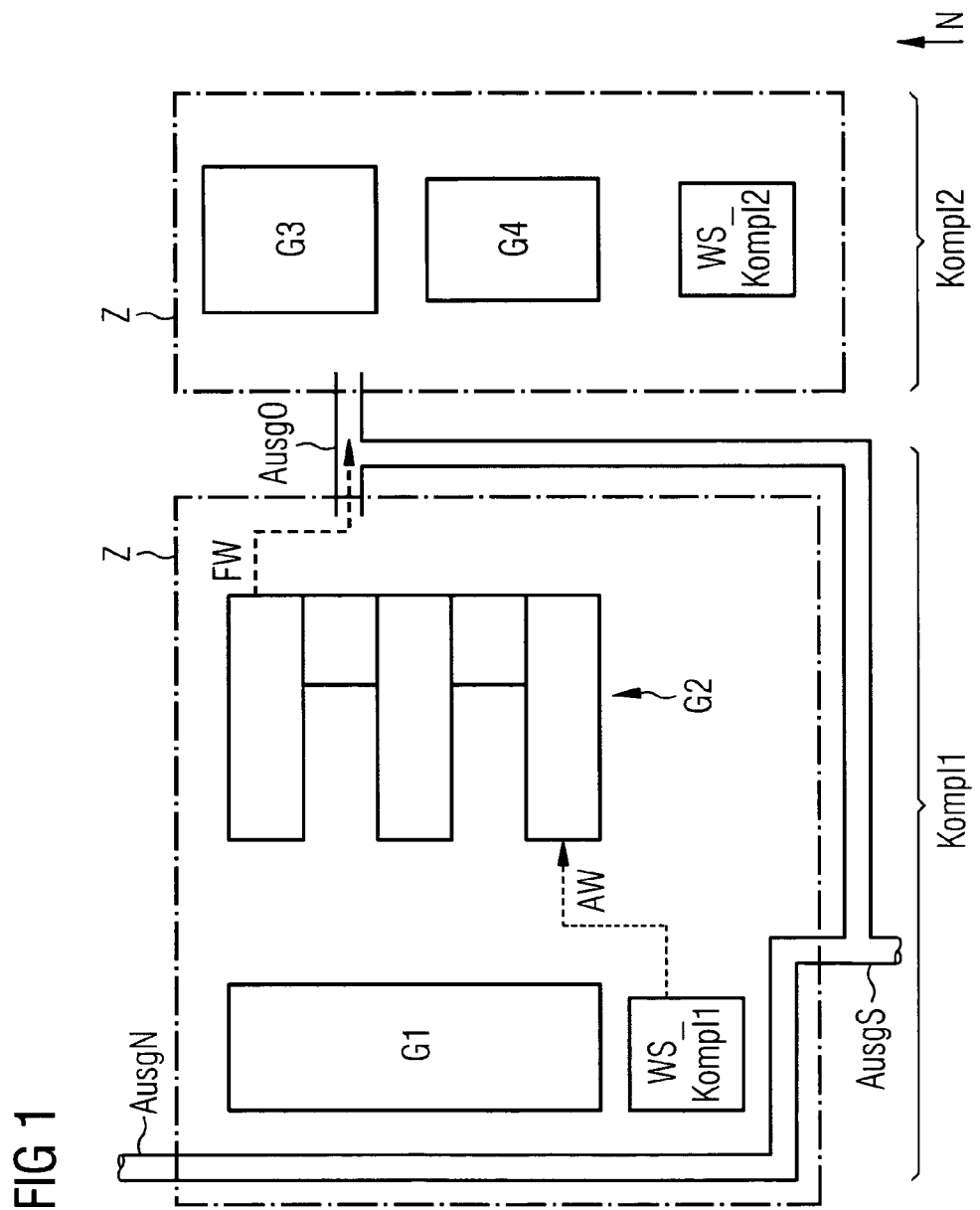
FIG. 1 an overview plan of a company site,
  FIG. 2 a building floor plan,
  FIG. 3 a detailed plan of a part of a building, and
  FIG. 4 a schematic diagram of a communication network KN.
Figure 2:
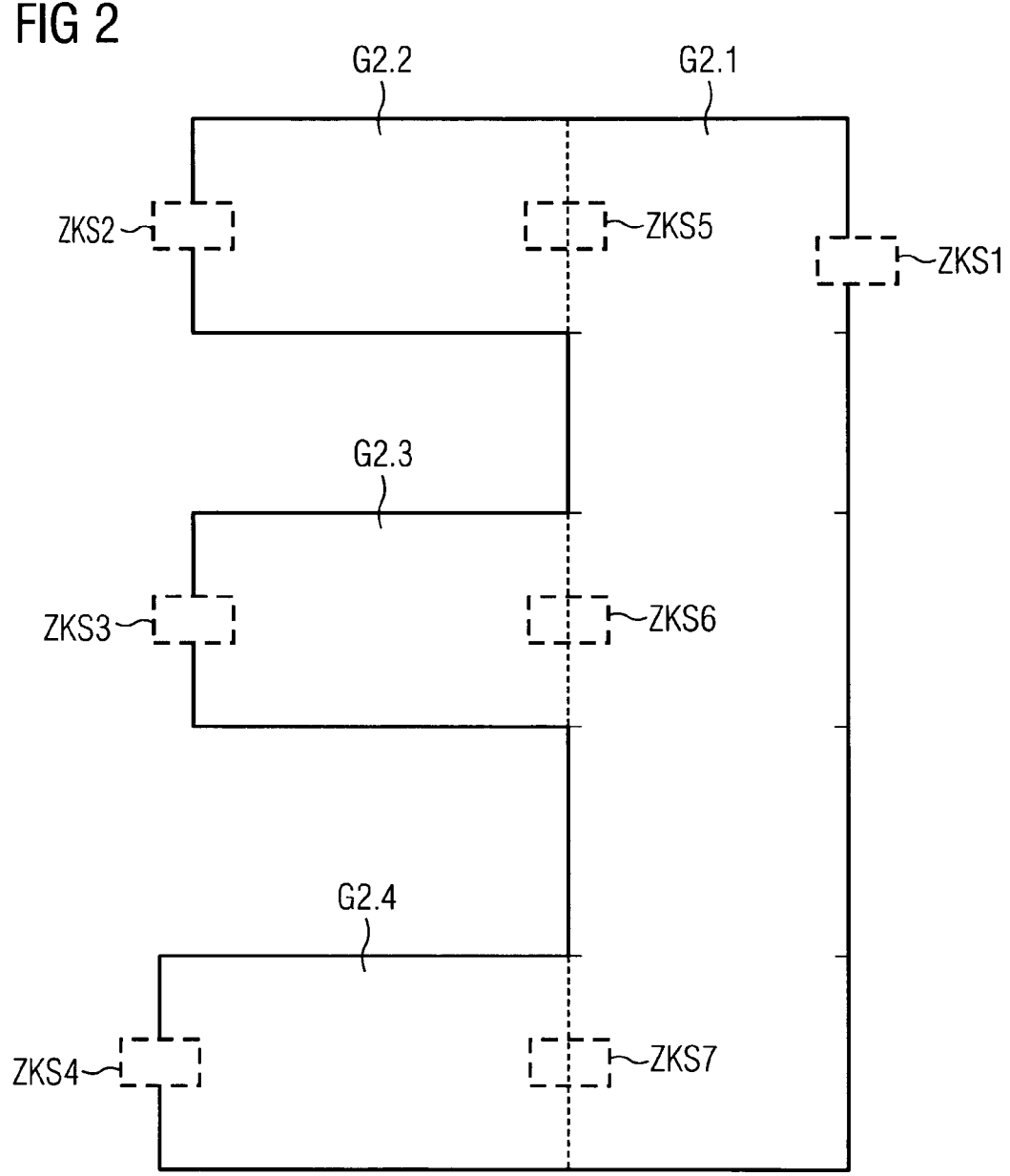

FIG. 1 shows a schematic of an emergency system with a company site, on which two building complexes, labeled Kompl1, Kompl2 are located. The first building complex Kompl1 consists of three buildings. Two buildings of this complex are designated G1 and G2 respectively. The first building G1 is a building line running in a north-south direction. Further details of the second building G2 can be found in FIG. 2. The second building G2 also has a building line G2.1 running in a north-south direction, but building G2 additionally has three side wings G2.2, G2.3, G2.4 running in an east-west direction, see FIG. 2. The first building G1 is single-storey building while the second building G2, including the lengthwise and side wings G2.1 and G2.2, G2.3, G2.4, has three storeys or floors E1 ... E3, see FIG. 3.

The first building complex Kompl1 also features a company security building labeled WS_Kompl1, FIG. 1. The first building complex Kompl1—like the further second building complex Kompl2—is screened from its surroundings by a hedge Z. The first building complex Kompl1 has a total of three exits, a northern exit AusgN, an eastern exit AusgO and a southern exit AusgS. To the south, outside the building complex on the other side of the hedge, is a rescue center of the local public fire service, not shown in the figure.

At the second building complex Kompl2 are a third and fourth building G3 and G4 and a further company security building WS_Kompl2, see FIG. 1.

The second building G2 has four exits, which are each equipped with an access control system ZKS1 ... ZKS4, see FIG. 2. At this access control system ZKS1 ... ZKS4 all persons wishing to enter the second building G2 must be individually identified—by their corporate ID card for example. Guests who do not have a corporate ID card are given a guest ID card for example by which they can identify themselves to one of the access control systems KS1 ... ZKS4. The access control systems ZKS1 ... ZKS4 typically record and store information such as the identity of the person entering the building, the time of entry into the building and the time of exit from the building. In addition similar access control systems ZKS5 ... ZKS7 of this type are also installed at the transition points between the side wings G2.2, G2.3 and G2.4 and the building line G2.1, see FIG. 2.

In side wing G2.4 there are six rooms designated R1 ... R6 on floors 1 and 2 respectively, see FIG. 3. Located in these rooms are the communication terminals KE1 ... KE4, which are arranged in a communication network KN—not shown in FIG. 3. Here the first communication terminal KE1 in the second room R2, the second communication terminal KE2 in the fourth room R4, the third communication terminal KE3 in the fifth room R5 and the fourth communication terminal K4 in the sixth room R6 are each connected to the communication network KN.

It is assumed for the exemplary embodiment that a fire breaks out in the first building complex Kompl1 in the second building G2, side wing G2.4, first floor E1, in the fifth room R5, see FIG. 3. FIG. 5 illustrates one method utilizing the invention for handling an emergency call that may be made regarding the fire breaking out and creating an emergency situation, which may also be understood from the below description of different embodiments of the invention.

As a result of the fire breaking out an emergency call is made from the third wired communication terminal KE3. The telephone number used is assigned to an emergency call center NZ arranged in the communication network KN—for example in the company security building WS_Kompl1, FIG. 4.

FIG. 4 identifies the emergency call by an arrow labeled N. In the emergency call center NZ the emergency call N is recorded as such.

Also implemented in the communication network KN is a database labeled DB in FIG. 4. Stored in it are both the communication terminals KE1 ... KEn arranged in the communications network KN, their call numbers and also position information POS1 ... POSn representing their positions. The position information POS1 ... POSn can in this case for example contain geographical information about the building complex Kompl1, building designations G or designations of parts of buildings, corridors, rooms R, floors E or similar.

In the course of dealing with the emergency call N, in accordance with the invention query information AI is generated by the emergency call center NZ and transmitted to the database DB in order to query the relevant communication terminal and position information KE1 ... KEn, POS1 ... POSn stored in the database DB. In this case the telephone number assigned to the third-party communication terminal KE3 making the emergency call is used to determine its position POS3.

Now, using a determination module EM likewise implemented in the communication network KN, based on the position information POS3 of the third-party communication terminals KE3, a danger area is defined and corresponding area information GB generated, see FIGS. 3 and 4. In this case, in addition to the position information POS3, further information determined in the course of the emergency call N, such as e.g. the nature of the emergency—in the exemplary embodiment the fire in side wing G2.4, fifth room R5—can be taken into account which is transferred from the emergency call center NZ. In the exemplary embodiment, on the basis of the information available to the emergency call center NZ about the fire in the fifth room R5, the danger area GB might be defined so as to include floors E1, E2 and E3 of the building side wing Kompl1, G2.4, see FIG. 3.

Inventively it is then determined in the determination module EM which communication terminals KE are to be selected, via which potentially endangered persons or rescue workers can be informed about the danger situation and which information is to be sent to these communication terminals KE.

As regards the selection of the communication terminals KE to be informed, these can for example be all communication terminals KE which are located in the defined danger area GB. Which terminals these are can for example be determined via a further query AI to the database DB. Alternatively however it would also be possible to select the communication terminals KE to be informed using further criteria. It would be possible to select all communication terminals KE located in rooms R or parts of the building adjoining the danger point affected by the danger situation. Thus in the exemplary embodiment it would be obvious as a result of the fire in the fifth room R5 on the first floor E1 to select all communication terminals KE located on the first, second and third floor E1, E2 and E3 of side wing G2.4.

Inventively for example a specific query to the database DB can be made in order to determine which communication terminals KE are located in the defined danger area GB.

Advantageously a query to the access control system ZKS would be conceivable. This would make it possible to determine all persons currently located within the area of the danger situation, since information is available about all persons who have identified themselves to the access control system ZKS in order to gain entry to side wing G2.4. A query to the database DB would now make it possible to determine the communication terminals KE assigned to these persons. In this case it would especially be possible not only to determine communication terminals KE linked to the fixed network but in addition wireless communication terminals KE, such as for example mobile telephones or Personal Digital Assistants, abbreviated to PDA.

Advantageously a high-priority message will be transmitted to all communication terminals K1 . . . K4, located in the immediate vicinity of the danger source of the fifth room R5.

As well as the selection of specific communication terminals KE of potentially endangered persons, the selection of communication terminals KE of specific rescue workers who can be ordered to provide help comes into consideration. Important criteria for this can include:

the position of the emergency and its relative location to other rooms R, building parts Gn.n, buildings G, exits Ausg and company security building WS_KompI1 with rescue workers WS_KompI1,
the nature and extent of the emergency,
the number of potentially endangered persons in the danger area GB, and
the availability of rescue personnel.

In the exemplary embodiment it would make sense, assuming a room fire limited in its extent in the fifth room R5, merely to select the communication terminals KE of the rescue workers in the company security service building WS_KompI1 since they are sufficient for fighting the limited danger. In addition the distance that they need to cover to the emergency point in the fifth room R5 is shorter than e.g. for the rescue workers in company security building WS_KompI2 or even public rescue workers outside the site.

After the communication terminals KE to be informed have been determined, emergency information NI is generated which contains the information to be transmitted to these communication terminals KE, see FIG. 4.

It would be conceivable to initially generate standardized evacuation or escape route information FW for endangered persons, FIGS. 1 and 4. This could however also be generated individually according to the location DE of the communication terminals KE. For the communication terminals KE of the rescue workers entry route information AW can be generated with the aid of the determination unit EM, FIGS. 1 and 4.

This emergency information NI especially contains information about the type of danger situation notified by the emergency call N, the urgency of the existing danger, the measures to be taken, the urgency of these measures to be taken and also exit route information for leaving the defined danger area GB.

After generation of this emergency information NI this is transmitted by the transmission module UM via the communication network KN to the identified communication terminals KE. Alternatively the emergency information NI can also be transmitted to output devices AE which are arranged in the danger area GB, FIG. 4. This can especially involve loudspeakers or other warning signal systems. At the communication terminals KE the emergency information NI can especially be in the form of voice messages, short messages, Short Message Service messages or e-mail.

Determination module EM, database DB and transmission module UM can advantageously be integrated into the emergency call center NZ, indicated in FIG. 4 by a dashed line labeled NZ.

Inventively the position of a communication terminal KE making the emergency call can also be determined in another way. One alternative is to use a positioning method based on Radio Frequency Identification ("RFID") technology, or wireless local area network ("WLAN") standards, Groupe Speciale Mobile ("GSM"), Universal Mobile Telecommunications System ("UMTS"), or Digital Enhanced Cordless Telecommunications ("DECT") standards, which determines a geographical position or presence in a spatial area. On the other hand this can also be done—especially outside buildings G—by means of a GPS system linked to the communication terminal KE. In this case the communication terminal KE making the emergency call can either automatically transmit position information POS generated by the GPS system to the emergency call center NZ. Alternatively this information can only be transmitted if this function has first been initialized by the emergency call center NZ.

The method in accordance with the invention is not restricted to the exemplary embodiment but can be employed in all communication networks KN which allow a positioning system to handle emergency calls N from a communication terminal KE.

The invention claimed is:

1. A method for handling emergency calls from a communication terminal comprising:

a call center determining a position of the communication terminal making an emergency call after the emergency call has been received;
the call center defining a spatial area around the position of the communication terminal as a danger area;
the call center identifying communication terminals comprising wireless communication terminals located in the danger area by utilizing one or more communication networks or localization devices;
the call center generating emergency information; and
the call center transmitting the generated emergency information to at least one of the identified wireless communication terminals located in the danger area;
the emergency information describing a type of danger situation, and/or urgency of the danger situation, and/or type of measures to be taken, and/or urgency of the measures, and/or escape route information for leaving the defined danger area;
the position of the communication terminal making the emergency call and of the wireless communication terminals in the danger area being determined with the aid of a Global Positioning System, and/or by system-inherent positioning methods of Groupe Speciale Mobile ("GSM"), Universal Mobile Telecommunications System ("UMTS"), Digital Enhanced Cordless Telecommunications ("DECT"), Radio Frequency Identification ("RFID"), or wireless local area network ("WLAN") networks, and position information is generated indicating the position of the communication terminal making the call and of the wireless communication terminals in the danger area, and the danger area is defined with the position information of the communication terminal making the emergency call;
the emergency information being transmitted to the communication terminal making the emergency call and the wireless communication terminals located in the danger area by a communication sent to the wireless communication terminals and communication terminal making the emergency call as at least one of: a voice message, a short message, a Short Message Service messages and an e-mail via a communication network;
the wireless communication terminals located in the danger area being identified by the emergency call center processing of information from a building or room access control system;
emergency information being transmitted to selected communication terminals of rescue workers inside and outside the danger area with the selection of rescue workers depending on a type of danger situation;

the communication terminals of rescue workers being selected depending on their position; and wherein entry route navigation aid information is transmitted to the selected communication terminals of the rescue workers, depending on where the danger area is located; and wherein emergency information is transmitted to the communication terminals of the rescue workers concerning the danger situation, and/or the extent of the danger situation, and/or a possible number of persons involved; and wherein further emergency call information from the communication terminal making the emergency call, and/or further information that represents a position that deviates from the position of the communication terminal making the emergency call is taken into account.

2. The method as claimed in claim 1, wherein the position of the communication terminal making the emergency call is mapped onto an image representing the danger area.

3. A method for handling emergency calls from a communication terminal comprising:

a call center determining a position of the communication terminal making an emergency call after the emergency call has been received;

the call center defining a spatial area around the position of the communication terminal as a danger area;

the call center identifying communication terminals comprising wireless communication terminals located in the danger area by utilizing one or more communication networks or localization devices;

the call center generating emergency information; and the call center transmitting the generated emergency information to at least one of the identified wireless communication terminals located in the danger area; and wherein the position of the communication terminal making the emergency call is determined by the emergency call center transmitting a query to a database, the database identifying communication terminals in the one or more communication networks and position information for each of the communication terminals identified in the database and wherein the database responds to the query such that the emergency call center determines where the communication terminal making the emergency call is located; and wherein the call center identifies communication terminals located in the danger area with the aid of one or more communication networks or localization devices by querying the database to determine which terminals are located in the danger area.

4. The method of claim 3 wherein the call center identifies wireless communication terminals located in the danger area with the aid of one or more communication networks or localization devices is also performed by the call center querying access control systems to determine persons located within the danger area and subsequently querying the database to determine which wireless communication terminals are assigned to the determined persons located within the danger area so that the emergency information is transmitted to the wireless communication terminals assigned to the determined persons located within the danger area via voice messages, short messages, Short Message Service messages or e-mail.

5. A method for handling emergency calls from a communication terminal, comprising:

a call center determining the position of the communication terminal making the emergency call after an emergency call has been received;

the call center defining a spatial area around the position of the communication terminal as a danger area;

the call center identifying communication terminals located in the danger area by utilizing one or more communication networks or localization devices;

the call center generating emergency information; and the call center transmitting the generated emergency information to the communication terminal making the emergency call, and/or at least one of the identified communication terminals, and/or at least one output device located in the danger area; and wherein the emergency call center communicates with a determination module to define the danger area and to identify the terminals in the danger area, the determination module being located in the one or more communication networks.

6. An emergency system for handling emergency calls from a communication terminal, comprising:

an emergency call center and a database for determining a position of the communication terminal making the emergency call;

at least one determination module for defining a spatial area around the determined a position of the communication terminal as a danger area;

a communication network or a localization device that identifies wireless communication terminals located in the danger area; and the at least one determination module generating emergency information for transmitting to the wireless communication terminals located in the danger area; and wherein the call center queries at least one access control system located in at least one building to determine persons located within the danger area and subsequently queries the database to determine which wireless communication terminals are assigned to the determined persons located within the danger area so that the emergency information is transmitted to the wireless communication terminals assigned to the determined persons located within the danger area via voice messages, short messages, Short Message Service messages or e-mail.

7. The emergency system of claim 6, further comprising an initialization module for an emergency system or emergency call center that initializes Global Positioning Systems, GPS, and/or system-inherent positioning methods in the wireless communication terminals or communication network.

8. The emergency system as claimed in claim 7, wherein the determination module further provides in the generation and transmission of the emergency information:

a type of danger situation, and/or urgency of the danger situation, and/or type of measures to be taken, and/or urgency of the measures to be taken, and/or escape route information for leaving the danger area, and/or entry route information for reaching the danger area.

9. The emergency system as claimed in claim 8, further comprising a transmission module that transmits the emergency information to wireless communication terminals of the identified persons via at least one of: Short Message Service, Multimedia Messaging Service, wirelessly transmitted voice messages, and e-mail.

* * * * *